No. 638,773. Patented Dec. 12, 1899.
C. W. TAYLOR.
TOOL FOR MAKING VENTILATING HOLES IN HATS.
(Application filed Aug. 2, 1899.)
(No Model.)

Witnesses:
Oscar F. Hill
Walter B. Russell.

Inventor:
Charles W. Taylor
by W. A. Copeland
his Attorney.

THE NORRIS PETERS CO., PHOTO-LITHO., WASHINGTON, D. C.

UNITED STATES PATENT OFFICE.

CHARLES W. TAYLOR, OF QUINCY, MASSACHUSETTS.

TOOL FOR MAKING VENTILATING-HOLES IN HATS.

SPECIFICATION forming part of Letters Patent No. 638,773, dated December 12, 1899.

Application filed August 2, 1899. Serial No. 725,838. (No model.)

*To all whom it may concern:*

Be it known that I, CHARLES W. TAYLOR, of Quincy, in the county of Norfolk and State of Massachusetts, have invented certain new and useful Improvements in Tools for Making Ventilating-Holes in Hats, of which the following is a specification.

As some gentlemen wish to have ventilating-perforations in their hats and some do not and as there is a variety of tastes as to the number, arrangement, and location of such perforations, the hats are usually left unperforated when put into the retail dealer's hands, it being left for him to make the perforations in accordance with the individual tastes of the customers.

My invention relates to a tool for doing this work; and the object of my invention is to make a tool by which this can be readily and quickly performed.

I will now proceed to fully describe the invention, which will be particularly pointed out in the claims at the end of the specification.

Figures 1, 2, 3, 4, 5, 6, 7:
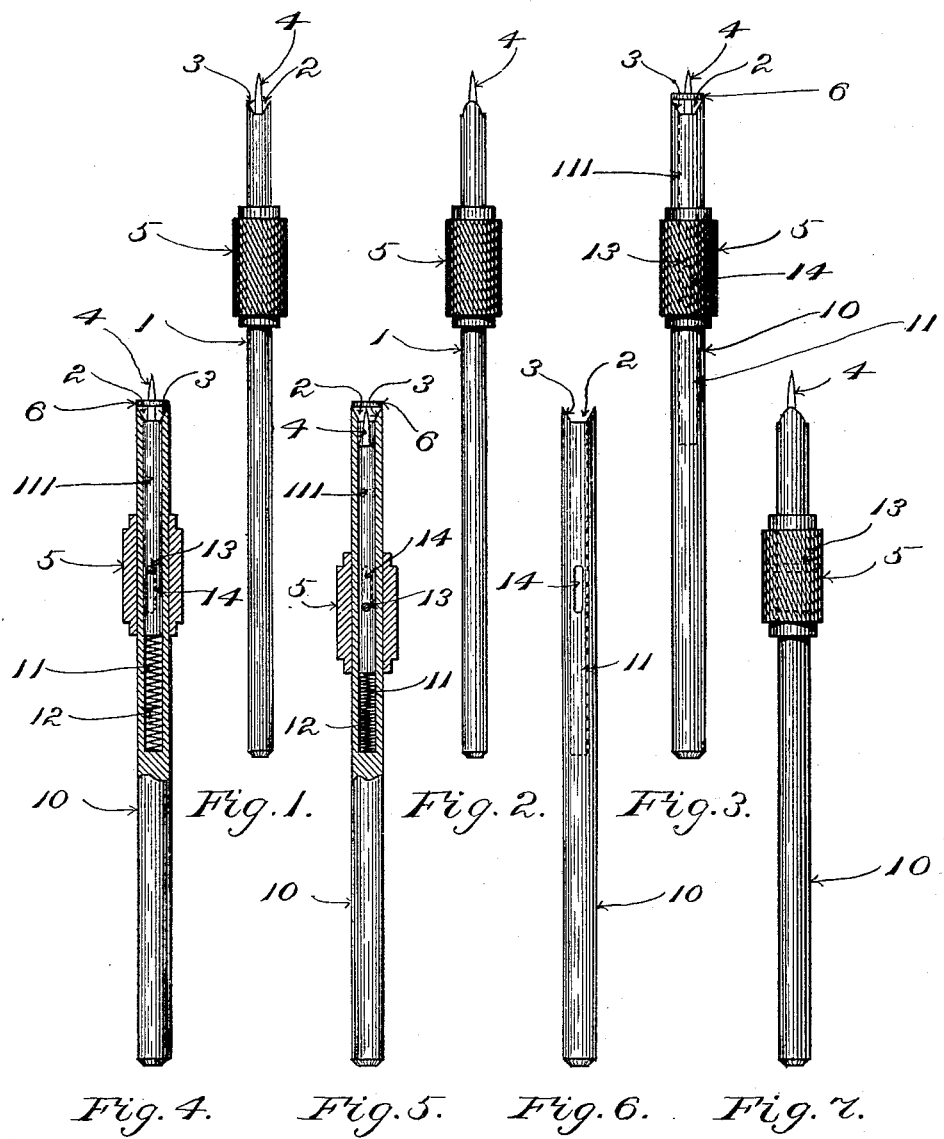
Figure 8:
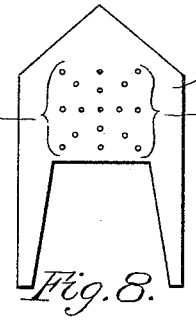

Figure 1 is a side elevation of a tool embodying my invention, showing the edge sides of the cutters. Fig. 2 is a side elevation taken at a right angle to that of Fig. 1. Fig. 3 is a side elevation of a modification of my invention in which the awl is set in a spring-seated plunger and showing a disk cut from the hat before it is removed from the awl. Fig. 4 is a longitudinal section of Fig. 3. Fig. 5 is a longitudinal section taken on the same line as Fig. 4, but showing the plunger and awl drawn back in the socket and the disk ready to drop off the awl. Fig. 6 is a side elevation of the hollow stock, showing the slot in the side through which extends the guide-pin from the sleeve. Fig. 7 is a side elevation at a right angle to Fig. 3. Fig. 8 is a plan of a pattern or design plate to be used with the tool.

The cylindrical stock 1 is formed with a notch or an obtuse-angled groove 2 in the end, the walls 3 of the groove having inside faces which flare outwardly to an intersection with the sides of the stock, thus forming two cutting-blades, which in end view are arcs of the periphery of the stock, which are also curved in the side view of Fig. 2 and which have the inner side beveled, viewed as in Fig. 3.

Projecting centrally from the end of the stock and from the bottom of the groove is an awl 4. Preferably there is a knurled sleeve or boss 5 on the stock for convenience of manipulation. In operation the awl is thrust through the hat wherever the ventilating-perforation is to be made, and when pushed in far enough to bring the blades in contact with the hat the stock is rotated, giving it a slight pressure at the same time, and the sharp edges of the blades will cut out a circular disk, forming a perforation the diameter of the stock. The advantage of the awl is to first puncture the hat at the place where the perforations are to be placed and also to hold the tool steady on its center while revolving it. When the tool is withdrawn after cutting the perforation, the disk cut out will usually stick to the awl, as shown in Fig. 4, and in order to conveniently remove the disk I prefer to make the tool as shown in Figs. 3 to 7. The stock 10 is formed with a socket 11 in the end, extending some distance inward. The awl 4 is set in the end of a plunger 111, which fits in said slot, and the plunger is seated on a spiral spring 12 in the bottom of the socket. The plunger is secured by a pin 13, which passes through the sleeve 5 and the elongated slot 14 in the side of the stock and through the plunger. The slot 14 thus allows the sleeve to be drawn back, pulling the plunger down until the point of the awl is quite or nearly flush with the end of the stock, when the disk 6 will drop off. The spring 12 will carry the plunger and sleeve out again when the pressure is removed.

In order to make sure that the operator will arrange the perforations in some symmetrical order or according to some design, I prefer to have a design or pattern plate 15 accompanying the tool, said pattern-plate having perforations 16 the size of the awl. By laying the pattern-plate on the hat and thrusting the awl through the perforations of the design and through the hat the proper places for the larger perforations will be indicated on the hat. The pattern-plate may then be removed and the perforations cut out at the points punctured by the awl. This pattern-plate I prefer to make of celluloid; but it may be made of any suitable material. The pattern-plate shown in the drawings represents several forms of designs combined, so that by the use of one plate the design may be greatly varied in form.

What I claim is—

1. A tool for cutting perforations having a cylindrical stock of metal with a groove in the end thereof, said groove having oblique sides which extend to the outer edge of the stock and form two segmental cutting-blades with convex edge, and an awl projecting centrally from the bottom of the groove beyond the ends of the blades, substantially as described.

2. A tool for cutting perforations having a cylindrical stock of metal formed with a socket in the end thereof, a notch in the end whose sides are inclined and intersect the sides of the stock forming cutting-blades, a spring-seated plunger within the socket having an awl which projects centrally therefrom, and guides which hold the plunger within the socket but allow longitudinal movement therein, substantially as described.

In testimony whereof I have affixed my signature in presence of two witnesses.

CHARLES W. TAYLOR.

Witnesses:
WILLIAM A. COPELAND,
ROBT. WALLACE.